United States Patent [19]

Janiszewski

[11] Patent Number: 5,715,727
[45] Date of Patent: Feb. 10, 1998

[54] MOTOR VEHICLE GEARBOX

[75] Inventor: Grzegorz Janiszewski, Angered, Sweden

[73] Assignee: AB Volvo, Gothenburg, Sweden

[21] Appl. No.: 607,490

[22] Filed: Feb. 27, 1996

[30] Foreign Application Priority Data

Mar. 3, 1995 [SE] Sweden .................................. 9500781

[51] Int. Cl.$^6$ .................................................. F16H 3/093
[52] U.S. Cl. ........................... 74/325; 74/330; 74/331
[58] Field of Search ....................... 74/329, 330, 331, 74/325

[56] References Cited

U.S. PATENT DOCUMENTS 4,738,149  4/1988  Janiszewski ........................ 74/330
5,184,522  2/1993  Nordkvist ........................ 74/331 X
5,311,789  5/1994  Henzler et al. ........................ 74/331

FOREIGN PATENT DOCUMENTS 2-11952  1/1990  Japan ........................ 74/331
763631   9/1980  U.S.S.R. ........................ 74/330

Primary Examiner—Khoi Q. Ta
Attorney, Agent, or Firm—Young & Thompson

[57] ABSTRACT

A six speed vehicle gearbox, comprising an input shaft (2) and two countershafts (3,4) which has six pairs of inter-engaging gears (7–11,30,14,16,18,19,21,23,31) for first to sixth inclusive. The disengageable gear (18) for the first gear speed engages a disengageable gear (23) on a fourth shaft (5) for the reverse gear.

5 Claims, 4 Drawing Sheets

MOTOR VEHICLE GEARBOX

FIELD OF THE INVENTION

The present invention relates to a motor vehicle gearbox comprising a housing with an input shaft, which carries a number of gears corresponding to the number of gear speeds forward, and two countershafts which lie in a plane offset from the input shaft and have gears in engagement with the gears on the input shaft, at least one gear of each pair of interengaging gears on said shafts being disengageable on its shaft, one of said disengageable gears being mounted on one of the countershafts and being disposed to transmit torque in first gear to a final drive, while another is mounted on the input shaft and is disposed to transmit torque in the highest gear to the final drive.

BACKGROUND OF THE INVENTION

A gearbox of the above described type is known e.g. by SE-A-8601247-3. It has five gear speeds forward and one in reverse. The torque is transmitted in reverse from the input shaft via one countershaft to the other countershaft by virtue of the fact that a gear, joined to the hub of the disengageable gear for a first gear speed, on one countershaft engages a disengageable reverse gear on the other countershaft. This eliminates the need for a separate shaft for the reverse countergear. Instead, the first mentioned countershaft can also be used as a reverse gear shaft. This provides an especially compact, simple and inexpensive design which with its small axial dimensions is particularly suited for use together with transverse engines.

SUMMARY OF THE INVENTION

The purpose of the present invention is, starting from the above described known gearbox, to achieve a gearbox design, the five speed version of which can constitute the basic design for a six speed version. In other words, in principle all components of the five speed gearbox will have their counterparts as regards number and relevant placements in the six speed gearbox.

This is achieved according to the invention by virtue of the fact that the disengageable gear for transmitting torque in first gear engages an additional gear, which is carried disengageably by a fourth shaft and is arranged to transmit reversing torque to the final drive.

The design according to the invention involves, compared with the known five speed gearbox, that the gear joined to the hub of the disengageable gear for the first gear speed is eliminated and that the disengageable reverse gear is moved from one countershaft to an extra shaft and is driven directly by the disengageable gear for the first gear speed. This makes room for an extra pair of gears for a sixth gear speed without requiting any increase in the axial dimensions of the gearbox. By placing, according to the invention, the disengageable gear for the highest gear speed on the input shaft when expanding a five speed gearbox to a six speed gearbox, the disengageable gears of both fifth and sixth will be journalled on the same shaft, which provides a suitable shift pattern for the movement of the gear lever at the same time as production costs are optimised by parallel production of both types.

BRIEF DESCRIPTION OF THE DRAWINGS

The invention is described in more detail with reference to the examples shown in the accompanying drawings, where.

DESCRIPTION OF THE PREFERRED EMBODIMENTS

Figure 1:
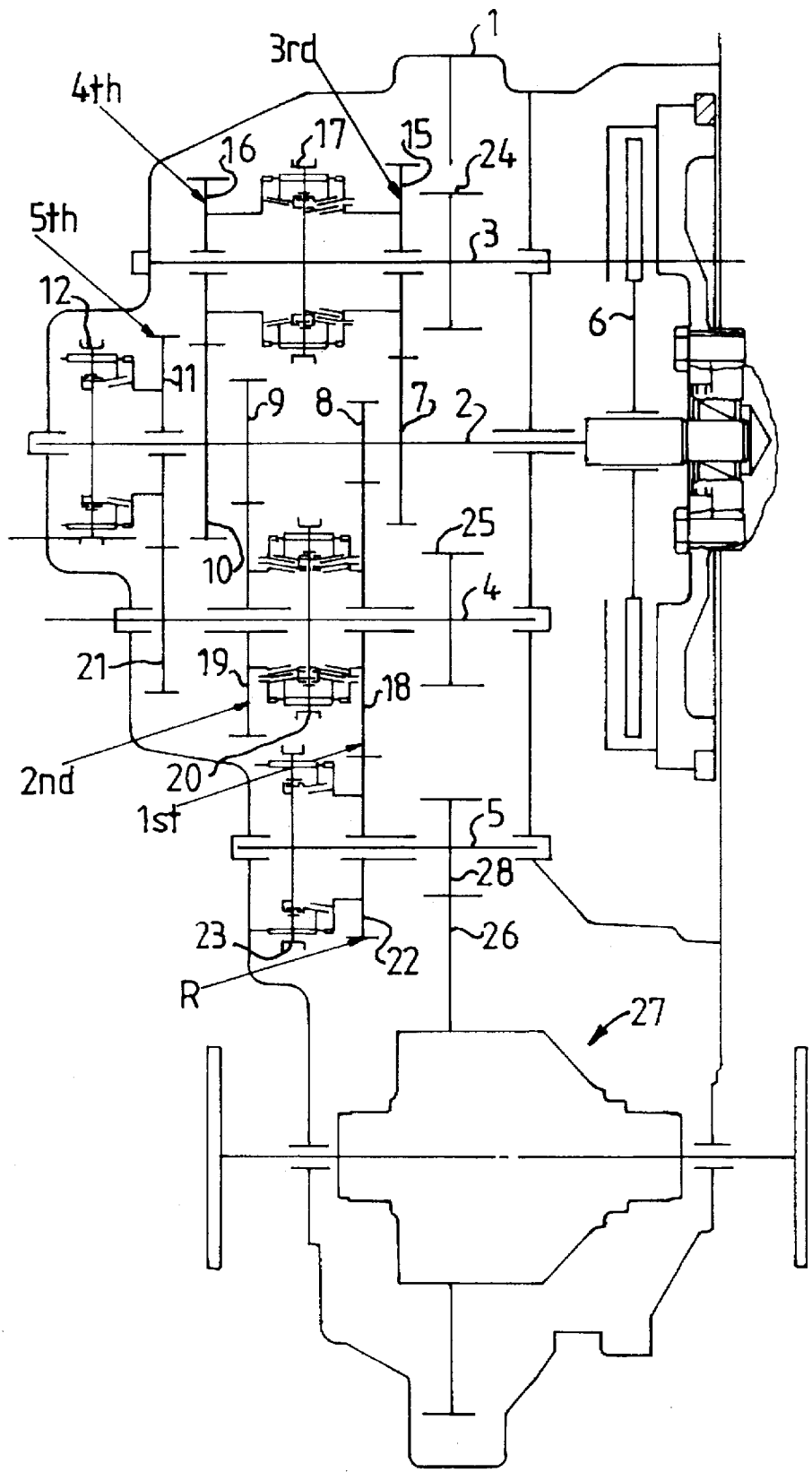
FIG. 1 shows a schematic longitudinal section through one embodiment of a five speed gearbox according to the invention.

In a gearbox housing generally designated 1 in FIG. 1, and which also forms a housing for a clutch, an input shaft 2, a first countershaft 3, a second countershaft 4 and a reverse shaft 5 are rotatably mounted. The input shaft 2 carries the disc 6 of the clutch and five gears 7, 8, 9, 10 and 11, of which the gears 7, 8, 9 and 10 are non-rotatably fixed to the shaft 2, while the gear 11 is a disengageable gear, i.e. it is rotatably mounted on its shaft but can be locked or released in a conventional manner by means of an engaging sleeve 12 with associated synchronizing means. On the countershaft 3, a pair of gears 15 and 16 are rotatably mounted and are lockable to the shaft by means of an engaging sleeve 17 comprising synchronizing means. On the countershaft 4 a pair of gears 18 and 19 are now rotatably mounted and can be locked to the shaft by means of an engaging sleeve 20 with synchronizing means. The countershaft 4 also carries a gear 21 which is non-rotabably joined to the shaft. On the reverse gear shaft 5 a gear 22 is rotatably mounted and can be locked to the shaft by means of an engaging sleeve, or clutch, 23 with synchronizing means.

A pair of gears 24 and 25 of equal size are each non-rotatably fixed to its respective countershaft 3, 4 and each engages a crown wheel 26 in a differential generally designated 27. A gear 28, which is somewhat smaller than the gears 24, 25, is non-rotatably fixed to the reverse shaft 5 and engages the crown wheel 26.

Which gear engage in respective gear speeds is evident from the Figures and only the torque transmission for the first and fifth gears speeds and reverse will be described in detail here. With the disengageable gear 18 locked to the countershaft 4 by means of the engaging sleeve 20 and the rest of the disengageable gears disengaged, the lowest gear speed is obtained for forward drive, i.e. first gear. With the disengageable gear 11 locked to the input shaft 2 by means of the engaging sleeve 12 and the remaining disengageable gears disengaged, the highest gear is obtained, i.e. fifth. When shifting from first to reverse, the disengageable gear 18 is disengaged and the reverse disengageable gear 22 is engaged instead by means of the clutch 23, and the disengageable gear 18 for first, which engages the reverse disengageable gear 22, serves as a countergear to impart a direction of rotation to the reverse shaft 5 which is opposite to the rotational direction of the countershafts 3, 4.

Placing the reverse disengageable gear 22 on a separate shaft 5 in combination with a disengageable gear 11 for the highest gear mounted on the input shaft 2 achieves two substantial advantages. In a five speed version, the gearbox can be made even shorter than the very shortest five speed gearboxes known up till now. A six speed version, which is shown in FIG. 2 and will be described below, can be achieved by simply building out the five speed version and the length of the six speed version need not exceed the length of the shortest hitherto known five speed gearboxes.

Figure 2:
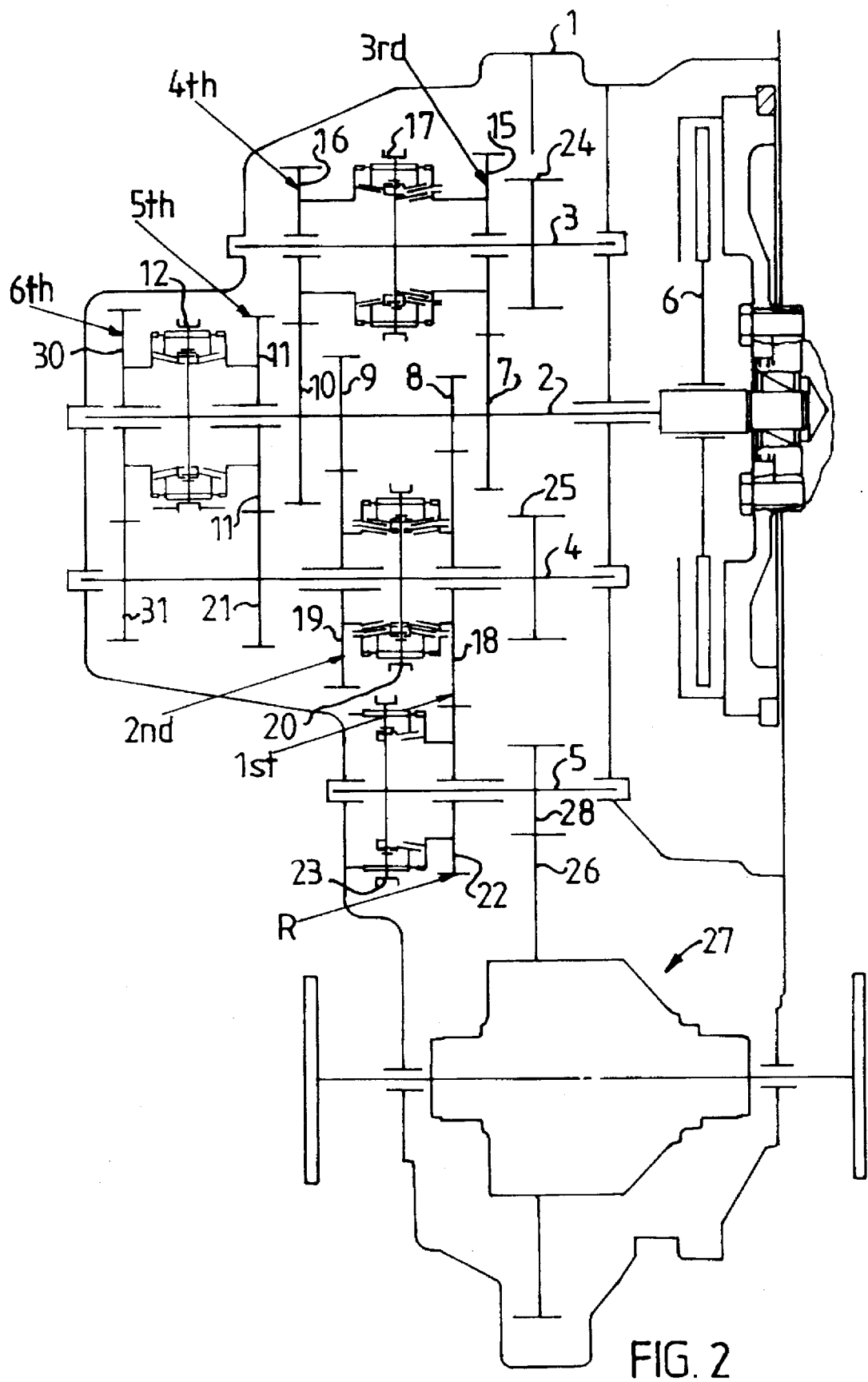
FIG. 2 shows a schematic longitudinal section through one embodiment of a six speed gearbox according to the invention.
Figure 3:
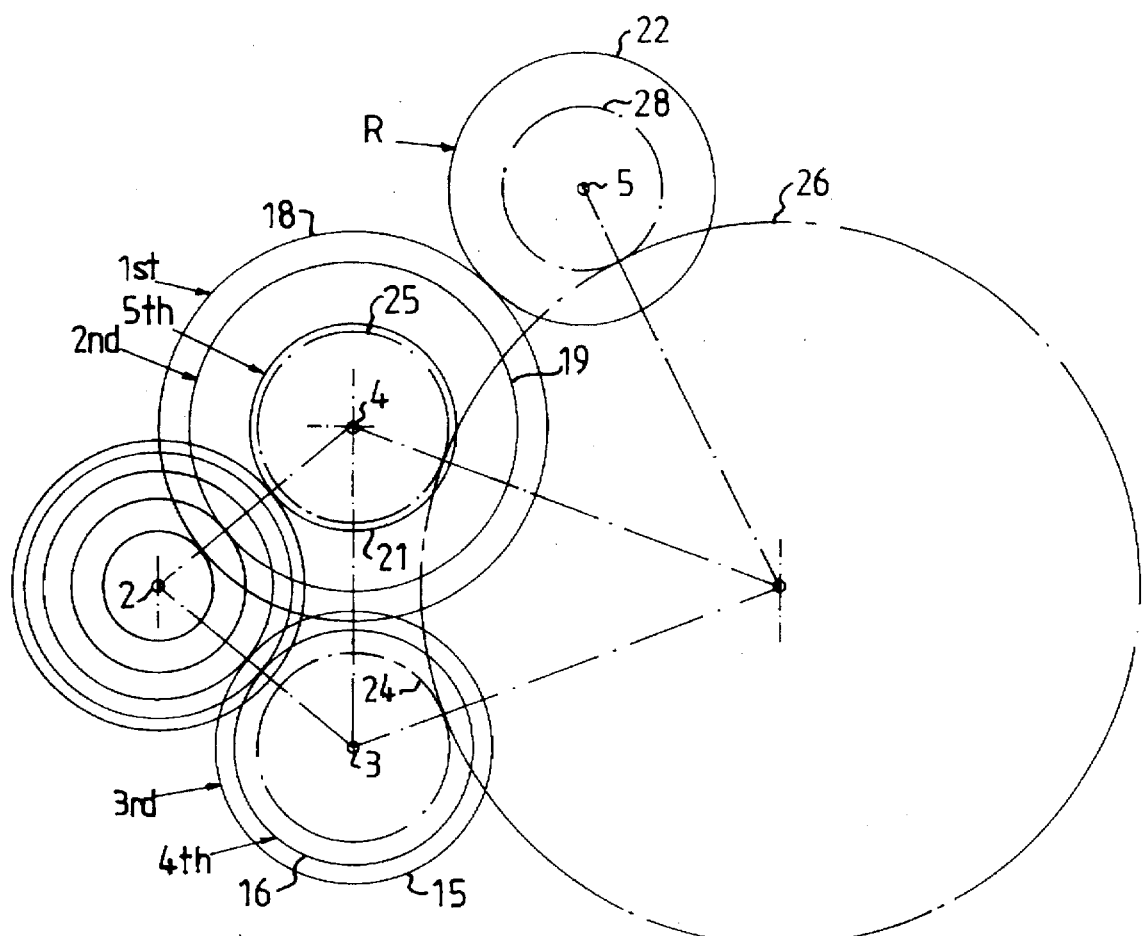
FIGS. 3 and 4 are schematic end views of the gearbox in FIG. 1 and FIG. 2, respectively.
Figure 5:
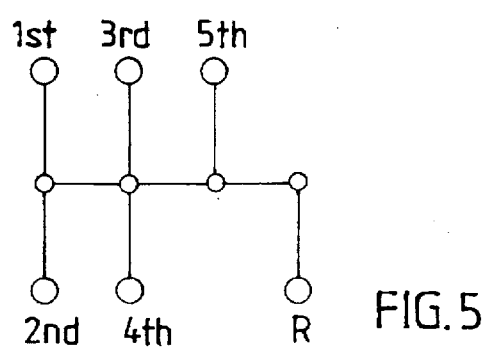
FIGS. 5 and 6 are the patterns of movement of the gear lever in the gearbox in FIGS. 1 and 2, respectively.
Figure 4:
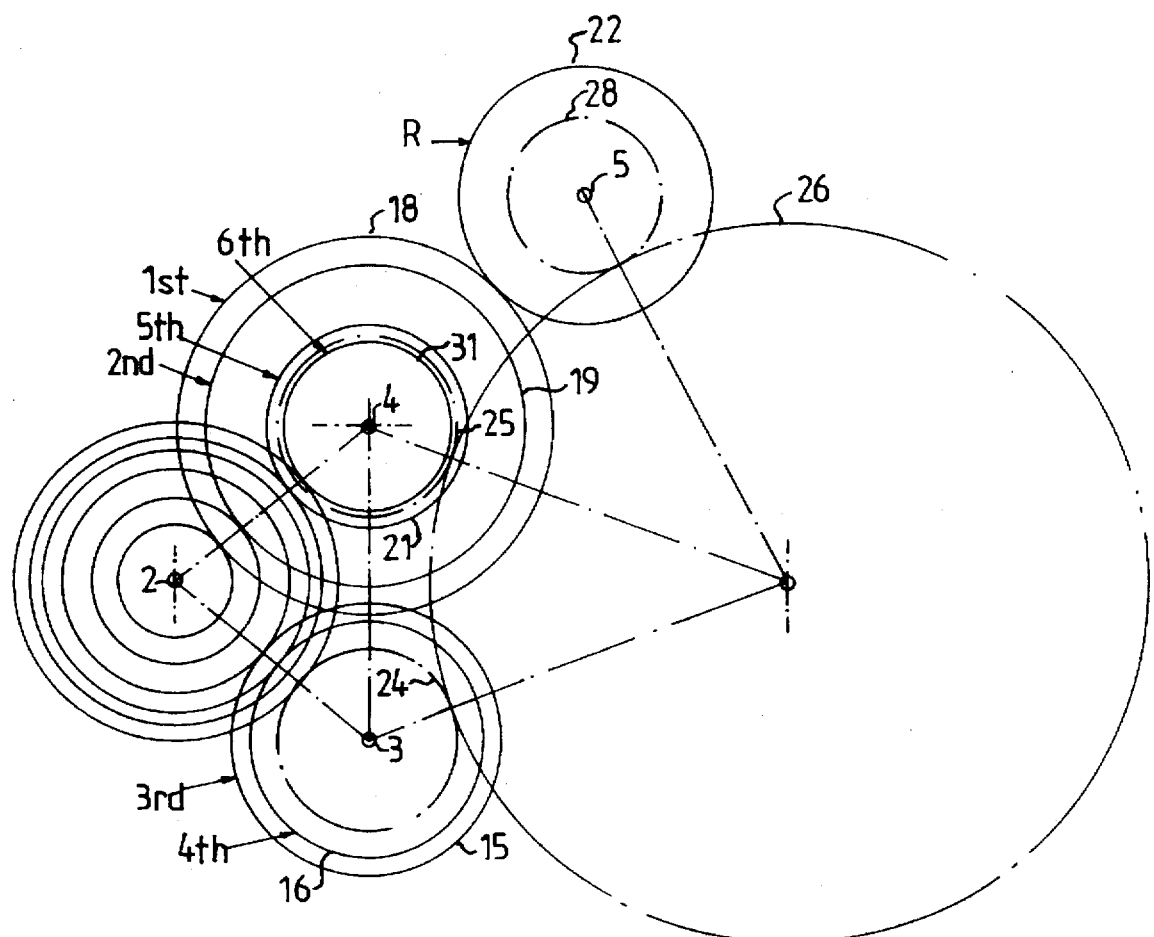
Figure 6:
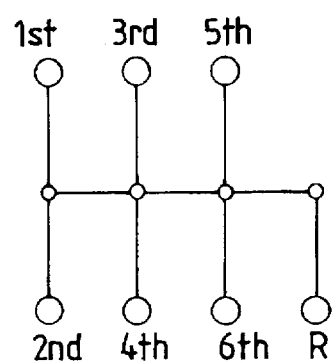

In FIG. 2 all of the components having counterparts in FIG. 1 have been labelled with the same reference numerals as in FIG. 1. Differences in size between the disengageable gears and the gears for first to fifth and reverse, resulting from differences in gear ratios between the two types have been disregarded.

As is evident from a comparison of FIGS. 1 and 2, the input shaft 2 and the countershaft 4 are somewhat longer in the latter version. A gear 30 is freely rotatably mounted on the extension of the input shaft 2 and can be locked to the input shaft by means of the same engaging sleeve 12 that locks the gear 11. In sixth gear, torque is transmitted to the crown wheel 26 of the differential 27 via the engaged gear 30, a gear 31 fixed to the extension of the countershaft 4 and the gear 25.

By placing the disengageable gear 30 for sixth next to the disengageable gear 11 for fifth on the input shaft, in addition to the above mentioned advantages, the shifting movement of the shift lever will automatically be given a suitable shift pattern.

What is claimed is:

1. A motor vehicle gearbox, comprising:

a housing with an input shaft and two countershafts;

the input shaft having a plurality of input shaft gears corresponding to a plurality of gear speeds forward;

the two countershafts lying in a plane offset from the input shaft and having a plurality of countershaft gears in engagement with the plurality of input shaft gears forming a plurality of pairs of interengaging gears;

at least one gear of each of said pairs of interengaging gears disengageable from a respective one of said input shaft and said two countershafts, a first one of said disengageable gears being mounted on one of the countershafts and transmitting torque in a lowest forward gear speed to a final drive, said first disengageable gear (18) for transmitting torque in the lowest forward gear speed engaging an additional disengageable gear (22), which is disengageable from a reverse shaft (5) and transmits reversing torque to the final drive (27).

2. The gearbox according to claim 1, further comprising shaft gears non-rotatably joined respectively to the countershafts (3,4) and the reverse shaft (5), each of said shaft gears engaging a crown wheel (26) of a differential (27).

3. The gearbox according to claim 1, further comprising a clutch for locking the additional disengageable gear (22) on the reverse shaft (5) to the reverse shaft.

4. The gearbox according to claim 1, wherein the input shaft (2) has six of said plurality of input shaft gears (7-11,30) in engagement with six of said plurality of countershaft gears (15,16,18,19,21,31) for transmitting torque to the final drive (27) with six gear ratios forward, a second one of said disengageable gears (11) for transmitting torque in a fifth gear speed being mounted on the input shaft (2).

5. The gearbox according to claim 4, further comprising a common engaging sleeve for engaging and disengaging the disengageable gears for the fifth and sixth gear speeds to provide a shifting pattern for a shift lever where the fifth gear speed and the sixth gear speed lie in alignment with each other.

* * * * *